United States Patent
Ifuku et al.

(10) Patent No.: US 8,980,010 B2
(45) Date of Patent: Mar. 17, 2015

(54) DUST REMOVING DEVICE AND DUST REMOVING METHOD

(71) Applicant: Canon Kabushiki Kaisha, Tokyo (JP)

(72) Inventors: Toshihiro Ifuku, Yokohama (JP); Tatsuo Furuta, Machida (JP); Hiroshi Saito, Kawasaki (JP); Kenichi Takeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/803,661

(22) Filed: Mar. 14, 2013

(65) Prior Publication Data

US 2013/0206164 A1  Aug. 15, 2013

Related U.S. Application Data

(62) Division of application No. 12/945,523, filed on Nov. 12, 2010.

(30) Foreign Application Priority Data

Nov. 26, 2009 (JP) ................................. 2009-269316

(51) Int. Cl.
*B08B 3/12* (2006.01)
*H04N 5/217* (2011.01)
(Continued)

(52) U.S. Cl.
CPC ............ *H04N 5/2171* (2013.01); *B06B 1/0648* (2013.01); *G02B 27/0006* (2013.01); *G03B 11/00* (2013.01); *G03B 17/02* (2013.01); *G03B 17/14* (2013.01); *H04N 5/2254* (2013.01)
USPC .......... 134/1; 134/6; 134/32; 134/42; 15/246; 15/250.001; 15/250.003; 310/311; 310/317; 310/328; 310/333; 310/357; 310/507

(58) Field of Classification Search
USPC ................. 134/1, 6, 32, 42; 15/246, 250.001, 15/250.003; 310/311, 317, 328, 333, 357, 310/507
See application file for complete search history.

(56) References Cited

U.S. PATENT DOCUMENTS 2,540,187 A  2/1951  Cherry, Jr. ..................... 310/358
3,115,588 A  12/1963  Hueter .......................... 310/331
(Continued)

FOREIGN PATENT DOCUMENTS

GB  2 232 037  11/1990
JP  55-145046  11/1980
(Continued)

OTHER PUBLICATIONS

Office Action issued on Jan. 28, 2013 in counterpart Chinese Patent Application No. 201010559658.8, with translation.
(Continued)

*Primary Examiner* — Bibi Carrillo
(74) *Attorney, Agent, or Firm* — Fitzpatrick, Cella, Harper & Scinto

(57) ABSTRACT

In a piezoelectric device, a first electrode and a second electrode are disposed to be opposed to each other on plate surfaces of the piezoelectric device, a first electrode plane of the piezoelectric device is fixedly bonded to a plate surface of a vibrating plate, a piezoelectric material forming the piezoelectric device is polarized in a direction parallel to the first electrode plane, the piezoelectric device is fixed to a base through a second electrode plane of the piezoelectric device, and the piezoelectric device generates a thickness-shear vibration with the fixed second electrode plane being a reference plane. The piezoelectric vibration generated by the piezoelectric device generates a flexural vibration in the vibrating plate, to thereby remove dust adhering to a surface of the vibrating plate.

3 Claims, 13 Drawing Sheets

(51) Int. Cl.
*B06B 1/06* (2006.01)
*G02B 27/00* (2006.01)
*G03B 11/00* (2006.01)
*G03B 17/02* (2006.01)
*G03B 17/14* (2006.01)
*H04N 5/225* (2006.01)

(56) References Cited

U.S. PATENT DOCUMENTS

| | | | | |
|---|---|---|---|---|
| 3,219,850 | A | | 11/1965 | Langevin ............... 310/333 |
| 3,252,017 | A | | 5/1966 | Bartels ............... 310/313 B |
| 3,325,743 | A | | 6/1967 | Blum ............... 330/5 |
| 4,387,973 | A | | 6/1983 | Martin ............... 350/582 |
| 4,929,072 | A | | 5/1990 | Fujie et al. ............... 350/582 |
| 5,013,888 | A | | 5/1991 | Okada et al. ............... 219/219 |
| 5,025,187 | A | | 6/1991 | Fujie et al. ............... 310/323 |
| 5,132,840 | A | | 7/1992 | Okada et al. ............... 359/512 |
| 5,136,425 | A | | 8/1992 | Fujie et al. ............... 359/507 |
| 5,148,312 | A | | 9/1992 | Kawai et al. ............... 359/507 |
| 5,155,625 | A | | 10/1992 | Komatsu et al. ............... 359/512 |
| 5,170,288 | A | | 12/1992 | Imaizumi et al. ............... 359/507 |
| 5,223,976 | A | | 6/1993 | Fujie et al. ............... 359/507 |
| 5,386,726 | A | | 2/1995 | Terajima ............... 73/504.16 |
| 5,638,209 | A | | 6/1997 | Okada et al. ............... 359/507 |
| 5,725,825 | A | * | 3/1998 | Hotomi et al. ............... 264/434 |
| 5,929,555 | A | | 7/1999 | Sugimoto et al. ............... 310/360 |
| 6,114,797 | A | | 9/2000 | Bishop et al. ............... 310/318 |
| 7,307,372 | B2 | | 12/2007 | Uchino et al. ............... 310/333 |
| 7,324,148 | B2 | | 1/2008 | Takizawa et al. ............... 348/340 |
| 2005/0280712 | A1 | | 12/2005 | Kawai ............... 348/207.99 |
| 2007/0247543 | A1 | * | 10/2007 | Hozumi et al. ............... 348/360 |
| 2009/0206698 | A1 | | 8/2009 | Okazaki ............... 310/317 |
| 2009/0267460 | A1 | * | 10/2009 | Satoh et al. ............... 310/365 |
| 2010/0231096 | A1 | | 9/2010 | Saito et al. ............... 310/365 |
| 2010/0247133 | A1 | * | 9/2010 | Sugahara ............... 399/81 |
| 2010/0264779 | A1 | * | 10/2010 | Ono ............... 310/339 |
| 2012/0032557 | A1 | * | 2/2012 | Furuta et al. ............... 310/317 |

FOREIGN PATENT DOCUMENTS

| | | | |
|---|---|---|---|
| JP | 63-312138 | | 12/1988 |
| JP | 64-016275 | | 1/1989 |
| JP | 2-095947 | | 4/1990 |
| JP | 2-310149 | | 12/1990 |
| JP | 3-005262 | | 1/1991 |
| JP | 3-159378 | | 7/1991 |
| JP | 3-200455 | | 9/1991 |
| JP | 9-323621 | | 12/1997 |
| JP | 2003-348403 | | 12/2003 |
| JP | 02004274596 | * | 9/2004 |
| JP | 2007-082062 | | 3/2007 |
| JP | 2008-218606 | | 9/2008 |
| JP | 2008-228074 | | 9/2008 |
| JP | 2009-130661 | | 6/2009 |
| JP | 2009-159479 | | 7/2009 |
| JP | 2009-296528 | | 12/2009 |

OTHER PUBLICATIONS

Office Action issued Jan. 28, 2013 in counterpart Chinese Patent Application No. 201010559658.8, with translation.
Extended European Search Report issued Mar. 23, 2011 in counterpart European Patent Application No. 10014921.0.

* cited by examiner

FIG. 2
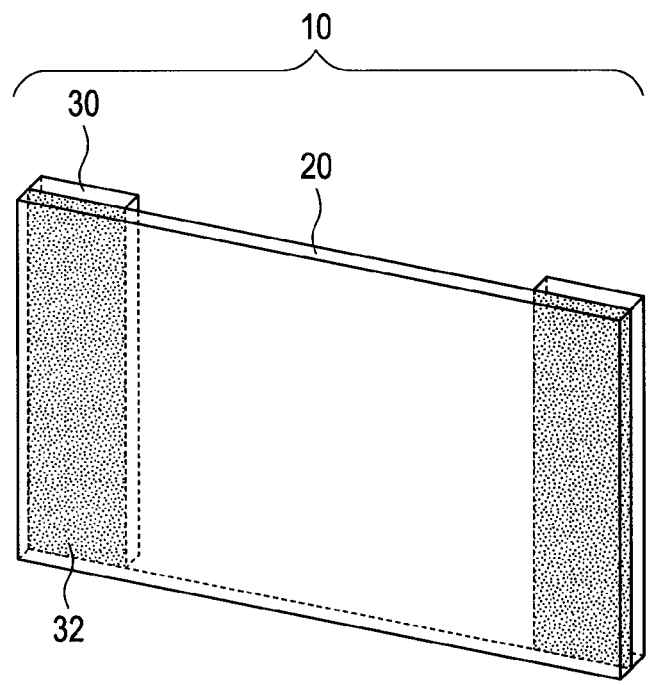
FIG. 3A       FIG. 3B       FIG. 3C
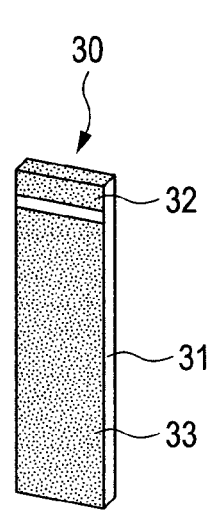  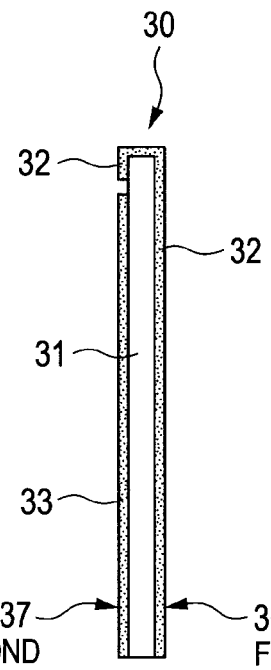  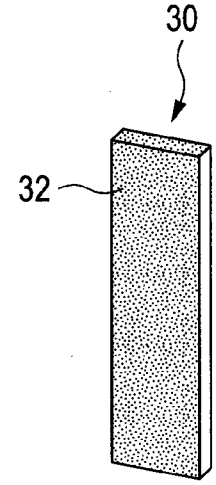

THICKNESS-SHEAR
VIBRATION

STRETCHING VIBRATION
IN LENGTH DIRECTION

DUST REMOVING DEVICE AND DUST REMOVING METHOD

RELATED APPLICATIONS

This application is a division of application Ser. No. 12/945,523, filed Nov. 12, 2010, claims benefit of that application under 35 U.S.C. §120, and claims benefit under 35 U.S.C. §119 of Japanese Patent Application No. 2009-269316, filed Nov. 26, 2009. The entire contents of each of the mentioned prior applications are incorporated herein by reference.

BACKGROUND OF THE INVENTION

1. Field of the Invention

The present invention relates to a technology of removing dust adhering to a surface of an image pickup device such as a digital camera and an optical component incorporated in the image pickup device, and more particularly, to a dust removing device and a dust removing method for removing dust through application of vibration.

2. Description of the Related Art

In an image pickup device such as a digital camera for picking up an image by converting an image signal into an electric signal, a photographing light flux is received by an image pickup element such as a charge coupled device (CCD) or a complementary metal oxide semiconductor (CMOS). Then, a photoelectric conversion signal output from the image pickup element is converted into image data, and the image data is recorded on a recording medium such as a memory card. In such an image pickup device, an optical low-pass filter and an infrared cut filter are disposed in front (on a subject side) of the image pickup element.

In the image pickup device of this type, when dust adheres to a surface of a cover glass of the image pickup element or to surfaces of those filters, the dust comes out as a black spot in the picked-up image. In particular, in a single-lens reflex digital camera which includes an interchangeable lens, dust may enter the digital camera main body through the opening of the lens mount when the lens is being changed, and may adhere to the surfaces of the cover glass of the image pickup element or of the filters.

In view of the above, there has been proposed a digital camera which includes a dust removing device for removing dust adhering to the surface by using a vibration of a piezoelectric device (see, for example, Japanese Patent Application Laid-Open Nos. 2003-348403 and 2008-228074).

In the dust removing device included in the digital camera disclosed in each of Japanese Patent Application Laid-Open Nos. 2003-348403 and 2008-228074, a voltage is applied to a piezoelectric device fixedly bonded to a vibrating plate so as to drive the piezoelectric device, to thereby generate elastic vibration (hereinafter, defined as flexural vibration) for causing a displacement of the vibrating plate in an optical axis direction, that is, in a thickness direction of the vibrating plate. The dust removing device removes dust adhering to the surface of the vibrating plate through application of the flexural vibration thus generated.

In the above-mentioned configuration, according to Japanese Patent Application Laid-Open No. 2003-348403, the vibrating plate is pressed, in the circumferential part thereof, by a member called pressing member, such as an annular-shaped member or multiple members. Due to a biased force applied by the pressing member, the dust removing device is held and fixed to the image pickup element or the digital camera main body.

Similarly, according to Japanese Patent Application Laid-Open No. 2008-228074, the vibrating plate is applied with a pressure by a member called holding member, such as a single component formed of a material such as metal having spring characteristics (elasticity). Due to a biased force applied by the holding member, the dust removing device is held and fixed to the image pickup element or the digital camera main body.

Further, the piezoelectric device is in the form of a plate having a ring shape or a rectangular shape, and includes a piezoelectric material and a pair of electrodes opposed to each other. The pair of electrodes include a first electrode and a second electrode which are disposed on plate surfaces of the piezoelectric material. The first electrode is also called lower electrode, and the second electrode is also called upper electrode. Here, a stretching strain is generated in the piezoelectric material by an electric field applied between the electrodes, which generates an elastic vibration (hereinafter, defined as length vibration) for causing a displacement of the piezoelectric device in a direction perpendicular to the optical axis of the vibrating plate, that is, in a direction (hereinafter, defined as length direction) perpendicular to the thickness direction of the piezoelectric device. Due to the length vibration of the piezoelectric device, a stress is generated between the piezoelectric device and the vibrating plate fixedly bonded to the piezoelectric device, to thereby generate a flexural vibration in the vibrating plate.

In the vibrating plate, a voltage to be applied to the piezoelectric device is controlled in frequency or phase, so that the flexural vibration of the vibrating plate may generate a standing wave of multiple orders, which is called vibration modes, having multiple nodes and antinodes, or a carrier wave which has nodes and antinodes and moves in a length direction of the vibration plate with respect to time. For example, in the dust removing device included in the digital camera disclosed in Japanese Patent Application Laid-Open No. 2008-228074, a pair of the piezoelectric devices are applied with voltages which are reversed in phase by 180 degrees, so that two vibration modes, namely, an 18th order vibration mode and a 19th order vibration mode, may be generated, and the two vibration modes are selectively used effectively, to thereby remove dust adhering to a surface of the vibrating plate.

Here, the dust removing device of Japanese Patent Application Laid-Open Nos. 2003-348403 and 2008-228074 is driven at a frequency in proximity to the resonance frequency of the vibrating plate, and hence a larger flexural vibration may be generated in the vibrating plate even when a smaller voltage is applied to the piezoelectric device.

Further, the magnitude of the length vibration of the piezoelectric device is closely related to a magnitude of the piezoelectric displacement resulting from the piezoelectric transverse effect of the piezoelectric ceramics.

Meanwhile, the piezoelectric device which is currently used in various devices uses a piezoelectric material containing a large amount of lead, such as lead zirconate titanate (PZT: $PbZr_{1-x}Ti_xO_3$) containing lead. However, it has been pointed out that such a piezoelectric material made of PZT containing a large amount of lead can be detrimental to ecosystems because the lead component in the piezoelectric material seeps into soil when the piezoelectric material is once discarded to be exposed to acid rain, for example. In view of this, in recent years, with consideration given to the environment and to comply with laws restricting the use of lead in various products, a piezoelectric material (lead-free piezoelectric material) containing no lead or a minimum amount of lead and product development therefor are under study and consideration. However, a lead-free material having various properties equivalent to those of PZT has not been realized, and there are still only a few examples of commercialized devices using a lead-free piezoelectric material which is equivalent in quality to PZT.

As described above, in the dust removing device included in the digital camera disclosed in Japanese Patent Application Laid-Open Nos. 2003-348403 and 2008-228074, a length vibration is generated in the piezoelectric device, to thereby generate a flexural vibration in the vibrating plate. The dust removing device removes dust adhering to the surface of the vibrating plate through application of the flexural vibration thus generated.

However, the vibration to be generated in the piezoelectric device is a length vibration, and hence the dust removing device cannot be directly fixed to the image pickup element or to the digital camera main body. Accordingly, in order to fixedly hold the dust removing device, a pressing member or a holding member needs to be provided for generating a biased force. However, the vibrating plate is subjected to the flexural vibration and the piezoelectric device itself is subjected to the length vibration, the dust removing device cannot be held without inevitably hindering the vibration of the vibrating plate, no matter where the dust removing device is held by the pressing member or the holding member. Accordingly, according to the conventional configuration of the dust removing device, there has been a problem that the dust removal performance is degraded when the dust removing device is held and fixed to an image pickup element or a digital camera main body.

Further, the conventional configuration of the dust removing device requires a pressing member and a holding member for fixing the dust removing device to an image pickup element or a digital camera main body, but the pressing member and the holding member are not essential to the dust removing device in the first place.

Further, a magnitude of the length vibration of the piezoelectric device is closely related to a magnitude of the piezoelectric displacement resulting from the piezoelectric transverse effect of the piezoelectric ceramics. The piezoelectric effects of the piezoelectric ceramics include, other than the piezoelectric transverse effect, a piezoelectric longitudinal effect, and a piezoelectric thickness-shear effect. Here, the piezoelectric transverse effect refers to a strain to be generated in the piezoelectric ceramics when an electric field is applied in the same direction as the polarization axis direction, in a direction perpendicular to the polarization axis direction and the electric field application direction. The piezoelectric longitudinal effect refers to a strain to be generated in the piezoelectric ceramics when an electric field is applied in the same direction as the polarization axis direction, in the same direction. The piezoelectric thickness-shear effect refers to shearing strain to be generated in the piezoelectric ceramics when an electric field is applied in a direction perpendicular to the polarization axis direction.

The relation of the magnitudes of the piezoelectric displacements resulting from the piezoelectric effects are defined as follows: piezoelectric thickness-shear effect>piezoelectric longitudinal effect>piezoelectric transverse effect. For example, in the case of lead zirconate titanate (PZT: $PbZr_{1-x}Ti_xO_3$) and barium titanate (BTO: $BaTiO_3$), which are representative examples of piezoelectric ceramics, a magnitude of the piezoelectric displacement resulting from the piezoelectric thickness-shear effect is more than twice as large as the piezoelectric displacement resulting from the piezoelectric transverse effect. In other words, in the conventional dust removing device using the length vibration of the piezoelectric device, there has been a problem that the displacement capability inherent in the piezoelectric device cannot be used effectively.

Further, in the dust removing device included in the digital camera of Japanese Patent Application Laid-Open No. 2008-228074, the piezoelectric device is in a rectangular solid shape. However, a wavefront (here, wavefront is defined as a continued surface obtained by connecting points in the same phase of the wave at a certain point of time) formed on the vibrating plate due to the flexural vibration generated in the vibrating plate is parallel to a certain side (hereinafter, referred to as longitudinal direction) of the piezoelectric device in a rectangular solid shape, which is parallel to the length direction of the piezoelectric device. However, the length vibration to be generated in the piezoelectric device occurs omnidirectionally in the length direction of the piezoelectric device, and hence the same wavefront with an equal amplitude may be difficult to form on the vibrating plate. Accordingly, according to the conventional dust removing device, there has been a problem that the dust removal performance greatly varies depending on the area on the vibrating plate.

SUMMARY OF THE INVENTION

The present invention has been made in view of the above, and therefore has an object to provide a dust removing device which is easy to fix and a dust removing method, which are capable of efficiently utilizing a displacement capability inherent in a piezoelectric device and achieving high dust removal performance.

In order to solve the above-mentioned problem, there is provided a dust removing device to be set on a base, including; a piezoelectric device in a form of a plate including a piezoelectric material in a form of a plate and a pair of electrodes being disposed to be opposed to each other on plate surfaces of the piezoelectric material; and a vibrating plate, in which the piezoelectric device has a first electrode plane fixedly bonded to a plate surface of the vibrating plate, in which the piezoelectric material is polarized in parallel with the first electrode plane, and in which the dust removing device is fixed to the base through a second electrode plane of the piezoelectric device.

In order to solve the above-mentioned problem, there is also provided a dust removing method of removing dust adhering to a vibrating plate installed on a base via a piezoelectric device in a form of a plate, which includes a piezoelectric material in a form of a plate and a pair of electrodes disposed to be opposed to each other on plate surfaces of the piezoelectric material, the dust removing method including; fixedly bonding a first electrode plane of the piezoelectric device to a plate surface of the vibrating plate, fixing a second electrode plane of the piezoelectric device to the base, and driving and vibrating the piezoelectric device after polarizing the piezoelectric material in parallel with the first electrode plane; and generating a vibration in the vibrating plate by the vibration of the piezoelectric device to thereby remove dust adhering to a surface of the vibrating plate.

According to the present invention, there may be provided a dust removing device which is easy to fix and a dust removing method, which are capable of efficiently utilizing a displacement capability inherent in the piezoelectric device and achieving high dust removal performance.

In particular, in a case where the piezoelectric device is in a rectangular solid shape, the wavefront of the flexural vibration generated in the vibrating plate may be easily formed with an equal amplitude, and hence there may be provided a dust removing device and a dust removing method having a higher dust removal performance.

Further features of the present invention will become apparent from the following description of exemplary embodiments with reference to the attached drawings.

BRIEF DESCRIPTION OF THE DRAWINGS

FIG. 2 illustrates another example of the dust removing device according to the present invention.

FIGS. 3A, 3B and 3C illustrate an example of a piezoelectric device according to the present invention.

DESCRIPTION OF THE EMBODIMENTS

Preferred embodiments of the present invention will now be described in detail in accordance with the accompanying drawings.

In the following, an embodiment for carrying out the present invention is described.

A dust removing device according to the present invention is a dust removing device to be installed on a base, which includes a piezoelectric device in the form of a plate at least including a piezoelectric material in the form of a plate and a pair of electrodes being disposed to be opposed to each other on plate surfaces of the piezoelectric material, and a vibrating plate. The dust removing device has features in that the piezoelectric device has a first electrode plane fixedly bonded to a plate surface of the vibrating plate, the piezoelectric material is polarized in parallel with the first electrode plane, and the dust removing device is fixed to the base through a second electrode plane of the piezoelectric device.

A dust removing method according to the present invention is a method of removing dust adhering to a vibrating plate installed on a base via a piezoelectric device in a form of a plate, which at least includes a piezoelectric material in a form of a plate and a pair of electrodes disposed to be opposed to each other on plate surfaces of the piezoelectric material. The method is featured by including: fixedly bonding a first electrode plane of the piezoelectric device to a plate surface of the vibrating plate, fixing a second electrode plane of the piezoelectric device to the base, and driving and vibrating the piezoelectric device after polarizing the piezoelectric material in parallel with the first electrode plane; and generating a vibration in the vibrating plate by the vibration of the piezoelectric device to thereby remove dust adhering to a surface of the vibrating plate.

Figure 1A:
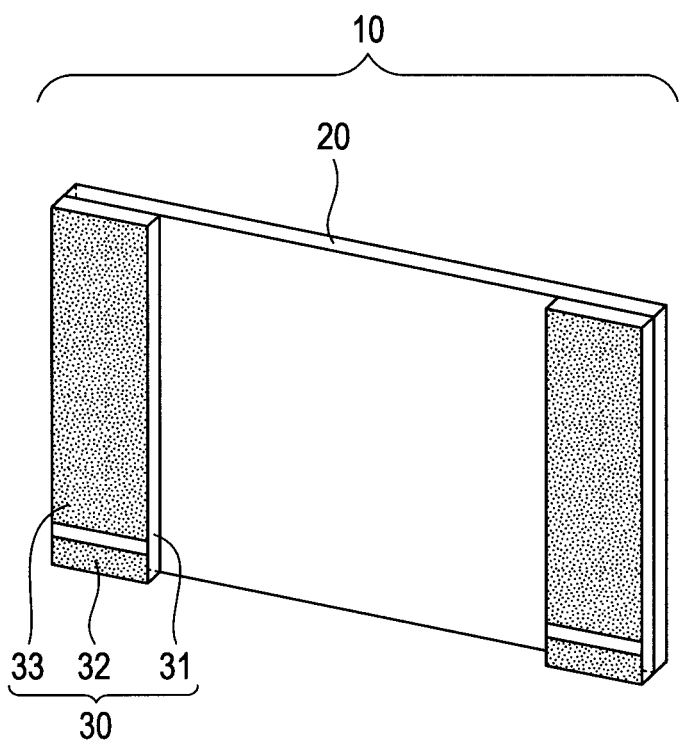
FIG. 1A illustrates an example of a dust removing device according to the present invention.
Figure 1B:
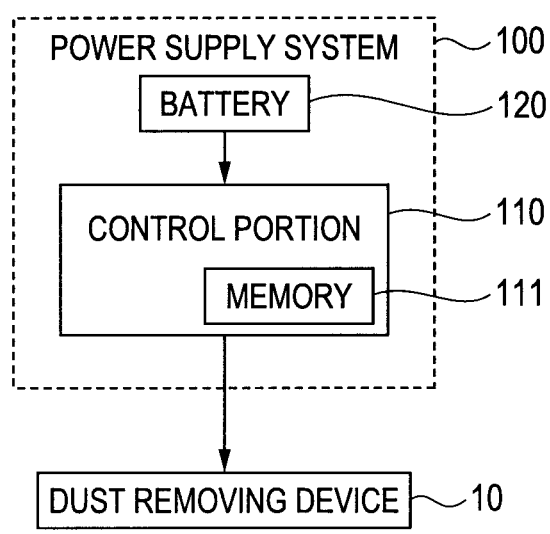
FIG. 1B is a circuit block diagram of the dust removing device according to the present invention.

FIGS. 1A, 1B, and 2 are schematic views each illustrating an example of the dust removing device of the present invention. For illustration, in the schematic views, components such as a power supply line from a power supply system are omitted from the drawings.

Referring to FIG. 1A, the dust removing device 10 includes a piezoelectric device 30 in the form of a plate and a vibrating plate 20.

With reference to a block diagram of FIG. 1B, a configuration of the dust removing device according to the present invention is described. A power supply system 100 includes a control portion 110 including a memory 111, and a battery 120. The dust removing device 10 is connected to the control portion 110 in the power supply system 100 via, for example, a flexible cable. The control portion 110 is configured to control the dust removing device 10 based on an alternating voltage generated from power supplied by the battery 120.

The piezoelectric device 30 is formed of, as illustrated in FIGS. 3A to 3C, a piezoelectric material 31, a first electrode 32, and a second electrode 33. The first electrode 32 and the second electrode 33 are each disposed to be opposed to plate surfaces of the piezoelectric material 31. One surface of the piezoelectric material 31 is defined as a first electrode plane 36, on which the first electrode 32 of FIG. 3C on the right in front of the piezoelectric device 30 is formed. Another surface of the piezoelectric material 31 is defined as a second electrode plane 37, on which the second electrode 33 of FIG. 3A on the left in front of the piezoelectric device 30 is formed. Here, the electrode plane in this embodiment refers to a surface of the piezoelectric device on which an electrode is formed, and, as illustrated in FIGS. 3A and 3B, for example, the first electrode 32 may be extended to come around to the second electrode plane 37.

As illustrated in FIG. 2, the piezoelectric device 30 is fixedly bonded to a plate surface of the vibrating plate 20 through the first electrode plane 36 of the piezoelectric device 30. When the piezoelectric device 30 is driven, a stress is generated between the piezoelectric device 30 and the vibrating plate 20, to thereby generate a flexural vibration in the vibrating plate 20. The dust removing device 10 according to the present invention removes dust adhering to a surface of the vibrating plate 20 through application of the flexural vibration thus generated in the vibrating plate 20. The flexural vibration refers to an elastic vibration for causing a displacement of the vibrating plate 20 in an optical axis direction, that is, in a thickness direction of the vibrating plate 20.

In the following, the difference between the piezoelectric device 30 according to the present invention and a piezoelectric device 40 of a conventional example is described in detail.

Figure 4A:
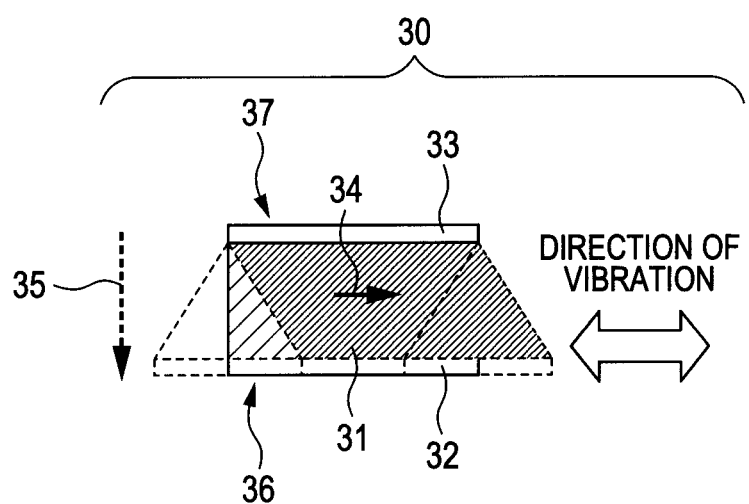
FIGS. 4A and 4B are schematic views illustrating a vibration principle of the piezoelectric device according to the present invention.
Figure 4B:
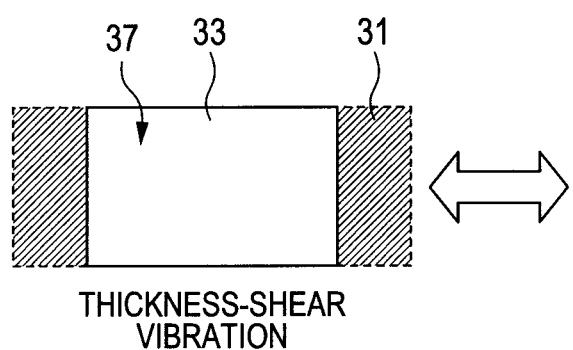

FIGS. 4A and 4B are schematic views illustrating a vibration principle of the piezoelectric device 30 according to the present invention. FIG. 4A is a schematic view illustrating in section the piezoelectric device 30 in the form of a plate, and FIG. 4B is a schematic view illustrating from above the second electrode plane 37 of the piezoelectric device 30 in the form of a plate. As illustrated in FIGS. 4A and 4B, in the piezoelectric device 30 of the present invention, the piezoelectric material 31 is polarized in advance in parallel with the first electrode plane 36 so that the first electrode 32 and the second electrode 33 may be applied with a high-frequency voltage by, for example, a drive power supply of the digital camera main body.

In the piezoelectric device 30 according to the present invention, an alternating electric field generated in a direction of the arrow 35 of FIG. 4A causes a shearing strain to occur in the piezoelectric material 31. The shearing strain causes an elastic vibration (hereinafter, defined as thickness-shear vibration) for displacing the first electrode plane 36 and the second electrode plane 37 from each other in the length direction of the piezoelectric device 30. As illustrated in FIGS. 4A and 4B, in the thickness-shear vibration, the piezoelectric material 31 is polarized in parallel with the first electrode plane 36 (in a direction of the arrow 34 of FIG. 4A), and the electric field is applied in the thickness direction of the piezoelectric device 30. At this time, a direction of vibration of the piezoelectric device 30 permissible in the length direction is only in a direction parallel to a polarization axis direction 34 of the piezoelectric material 31. A magnitude of the thickness-shear vibration in the piezoelectric device 30 is closely related to a magnitude of the piezoelectric displacement resulting from the piezoelectric thickness-shear effect of the piezoelectric ceramics.

Figure 5A:
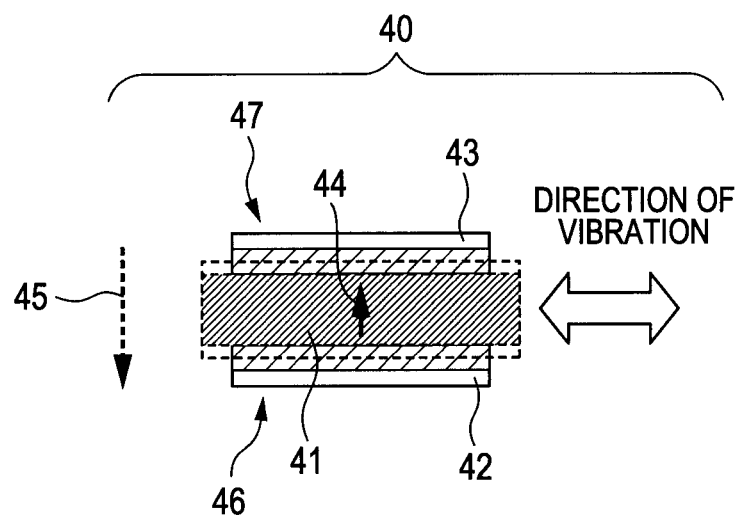
FIGS. 5A and 5B illustrate a vibration principle of a conventional piezoelectric device.
Figure 5B:
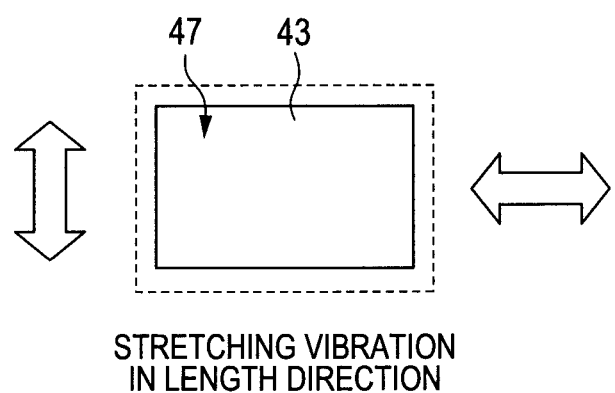

Meanwhile, FIGS. 5A and 5B are schematic views illustrating a vibration principle of the conventional piezoelectric device 40. FIG. 5A is a schematic view illustrating in section the piezoelectric device 40 in the form of a plate, and FIG. 5B is a schematic view illustrating from above a second electrode plane 47 of the piezoelectric device 40 in the form of a plate. As illustrated in FIGS. 5A and 5B, in the piezoelectric device 40 of the conventional example, a piezoelectric material 41 is polarized in advance in parallel with a first electrode plane 46 so that a first electrode 42 and a second electrode 43 may be applied with a high-frequency voltage by, for example, a drive power supply of the digital camera main body.

In the piezoelectric device 40 of the conventional example, an alternating electric field generated in a direction (electric field direction) of the arrow 45 of FIG. 5A causes a stretching strain to occur in the piezoelectric material 41. The stretching strain causes the length vibration of the piezoelectric device 40. As illustrated in FIGS. 5A and 5B, in the length vibration, the piezoelectric material 41 is polarized perpendicularly to the first electrode plane 46 (in a direction of the arrow 44), and the electric field is applied in the thickness direction of the piezoelectric device 40. At this time, a direction of vibration of the piezoelectric device 40 permissible in the length direction is any direction perpendicular to a polarization axis direction 44 of the piezoelectric material 41, without depending on the shape, such as a rectangular shape or a cylindrical shape, of the piezoelectric device 40. A magnitude of the length vibration in the piezoelectric device 40 is closely related to a magnitude of the piezoelectric displacement resulting from the piezoelectric transverse effect of the piezoelectric ceramics.

By the way, in the piezoelectric device 30 according to the present invention, even when one of the first electrode plane 36 and the second electrode plane 37 of the piezoelectric device 30 is completely fixed, the piezoelectric device 30 itself still can generate the thickness-shear vibration. For example, as illustrated in FIGS. 4A and 4B, when the piezoelectric device 30 of the present invention is driven under a state in which the second electrode plane 37 of the piezoelectric device 30 is fixed to the base, the second electrode plane 37 of the piezoelectric device 30 does not vibrate due to the fixation, whereas the piezoelectric device 30 of the present invention is driven in the thickness-shear vibration, and hence the first electrode plane 36 of the piezoelectric device 30 can vibrate in the length direction of the piezoelectric device 30. Here, when the second electrode plane 37 of the piezoelectric device 30 is fixed to the base, the movement of the second electrode plane 37 of the piezoelectric device 30 is completely locked at least in the length direction with respect to the base. Here, the base according to the present invention collectively means at least one member capable of completely locking the movement of the second electrode plane 37 of the piezoelectric device 30 at least in the length direction with respect to the base, and refers to a member having sufficient mass and rigidity capable of generating the flexural vibration in the vibrating plate 20 through the piezoelectric device 30.

On the other hand, in the conventional piezoelectric device 40, when one of the first electrode plane 46 and the second electrode plane 47 of the piezoelectric device 40 is fixed, the piezoelectric device 40 itself is hindered to generate the length vibration. For example, as illustrated in FIGS. 5A and 5B, when the conventional piezoelectric device 40 is driven under a state in which the second electrode plane 47 of the piezoelectric device 40 is fixed to the base, the piezoelectric device 40 itself fails to vibrate almost completely in all directions under the constraint of the fixed second electrode plane 47 because the piezoelectric device 40 is driven in the length vibration. The hindrance to the piezoelectric device 40 becomes more noticeable as the piezoelectric device 40 is reduced in thickness, and the piezoelectric device 40 in a conventional shape fails to vibrate almost completely.

Unlike the piezoelectric device 40 according to the conventional technology, the piezoelectric device 30 of the present invention has a feature that the piezoelectric device 30 is capable of generating a desired piezoelectric vibration even when the second electrode plane 37 of the piezoelectric device 30 is fixed to the base.

A magnitude of the thickness-shear vibration of the piezoelectric device 30 of the present invention is closely related to a magnitude of the piezoelectric displacement resulting from the piezoelectric thickness-shear effect of the piezoelectric ceramics. On the other hand, in the conventional piezoelectric device 40, a magnitude of the length vibration in the piezoelectric device 40 is closely related to a magnitude of the piezoelectric displacement resulting from the piezoelectric transverse effect of the piezoelectric ceramics.

As described above, the magnitude of the piezoelectric displacement resulting from the piezoelectric thickness-shear effect of the piezoelectric ceramics is equal to or more than twice as large as the magnitude of the piezoelectric displacement resulting from the piezoelectric transverse effect. In other words, the piezoelectric device 30 of the present invention has a larger displacement function, as compared to the conventional piezoelectric device 40, even when the same piezoelectric material is used. Conversely, it can be said that the piezoelectric device 30 of the present invention has a displacement function equal to that of the conventional piezoelectric device 40, even when a piezoelectric material with a smaller piezoelectric constant is used.

Next, the difference between the dust removing device 10 of the present invention and the conventional dust removing device is described in detail.

Figure 6A:
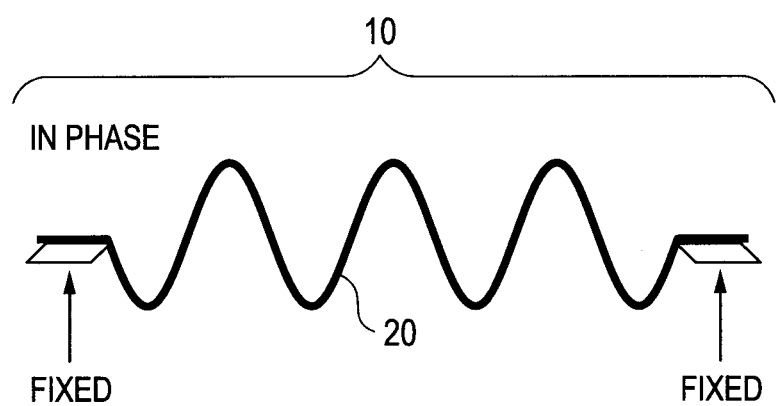
FIGS. 6A and 6B are schematic views illustrating a vibration principle of the dust removing device according to the present invention.
Figure 6B:
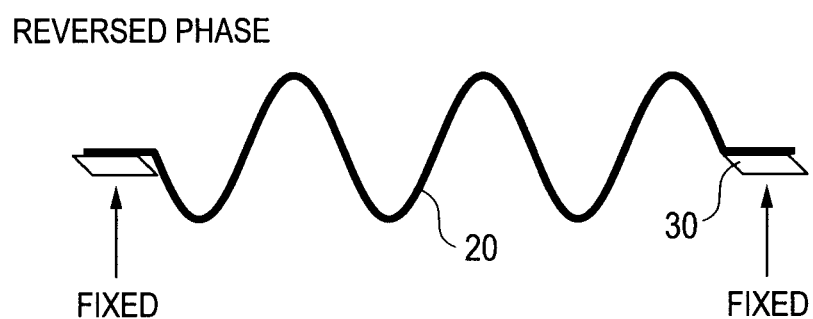

FIGS. 6A and 6B are schematic views illustrating the vibration principle of the dust removing device 10 according to the present invention. FIG. 6A illustrates a state in which a pair of the piezoelectric devices 30 on the right and left are applied with alternating voltages in the same phase to generate the flexural vibration in the vibrating plate 20. The pair of the piezoelectric devices 30 on the right and left face each other with the piezoelectric materials 31 being opposed to each other in polarization, and the dust removing device 10 is driven in a seventh order vibration mode. FIG. 6B illustrates a state in which a pair of the piezoelectric devices 30 on the right and left are applied with alternating voltages in a reversed phase, which are opposite in phase by 180 degrees, to generate the flexural vibration in the vibrating plate 20. The pair of the piezoelectric devices 30 on the right and left face each other with the piezoelectric materials 31 being opposed to each other in polarization, and the dust removing device 10 is driven in a sixth order vibration mode. In the dust removing device 10 of the present invention, at least two vibration modes are selectively used effectively as described above, to thereby remove dust adhering to the surface of the vibrating plate 20 with efficiency.

Figure 7A:
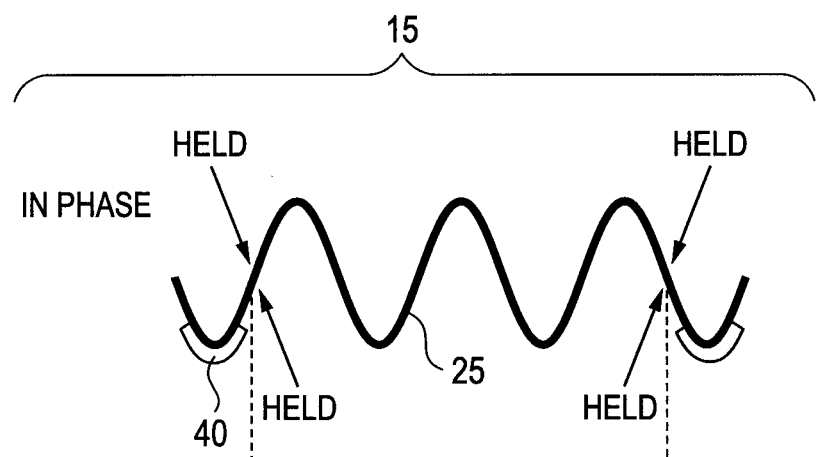
FIGS. 7A and 7B are schematic views illustrating a vibration principle of a conventional dust removing device.
Figure 7B:
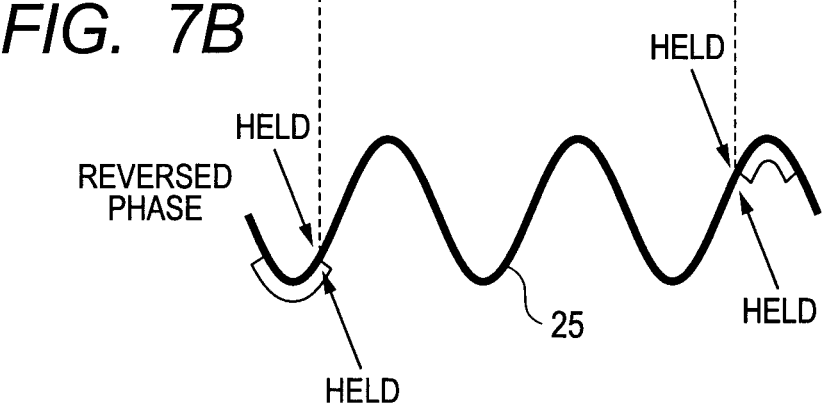

On the other hand, FIGS. 7A and 7B are schematic views illustrating a vibration principle of a conventional dust removing device 15. FIG. 7A illustrates a state in which a pair of the piezoelectric devices 40 on the right and left are applied with alternating voltages in the same phase to generate the flexural vibration in a vibrating plate 25. In the pair of the piezoelectric devices 40 on the right and left, the piezoelectric materials 41 are polarized in the same direction in the thickness direction of the piezoelectric devices 40, and the dust removing device 15 is driven in a seventh order vibration mode. FIG. 7B illustrates a state in which the pair of the piezoelectric devices 40 on the right and left are applied with alternating voltages in a reversed phase, which are opposite in phase by 180 degrees, to generate the flexural vibration in the vibrating plate 25. In the pair of the piezoelectric devices 40 on the right and left, the piezoelectric materials 41 are polarized in the same direction in the thickness direction of the piezoelectric devices 40, and the dust removing device 15 is driven in a sixth order vibration mode. In the conventional dust removing device 15, similarly to the dust removing device 10 of the present invention, at least two vibration modes are selectively used effectively, to thereby remove dust adhering to the surface of the vibrating plate with efficiency.

In the dust removing device 10 of the present invention, the piezoelectric device 30 is fixed to the base through the second electrode plane 37, and the vibrating plate 20 does not generate the flexural vibration in a part on which the piezoelectric device 30 is disposed. On the other hand, in the conventional dust removing device 15, the vibrating plate 25 generates the flexural vibration even in a part on which the piezoelectric device 40 is disposed. Accordingly, one of the piezoelectric devices 40 and at least in part of both of the plate surfaces of the vibrating plate 25 need to be held by a certain holding member so as to be fixed to the base by means of the holding member. However, the vibrating plate 25 generates the flexural vibration, and hence, if the dust removing device 15 is held by a pressing member or a holding member, the pressing member or the holding member cannot hold the vibrating plate 25 without affecting the vibration thereof, no matter where the vibrating plate 25 is held. Therefore, according to a configuration of the conventional dust removing device 15, the dust removal performance is degraded when the dust removing device 15 is held to be fixed to the base. On the other hand, in the dust removing device 10 of the present invention, there is no need to hold the vibrating plate 20 to be fixed to the base, and the vibrating plate 20 can be fixed to the base without degrading the dust removal performance.

Figure 8A:
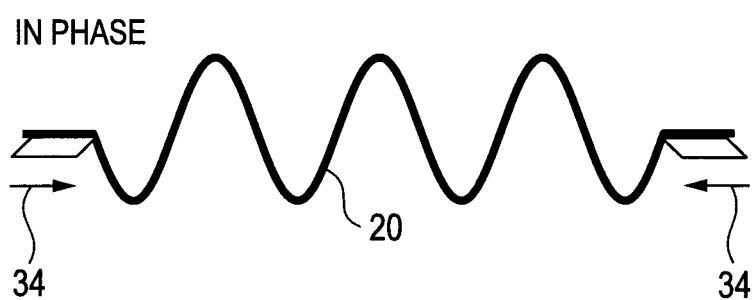
FIGS. 8A and 8B are schematic views illustrating the vibration principle of the dust removing device according to the present invention.
Figure 8B:
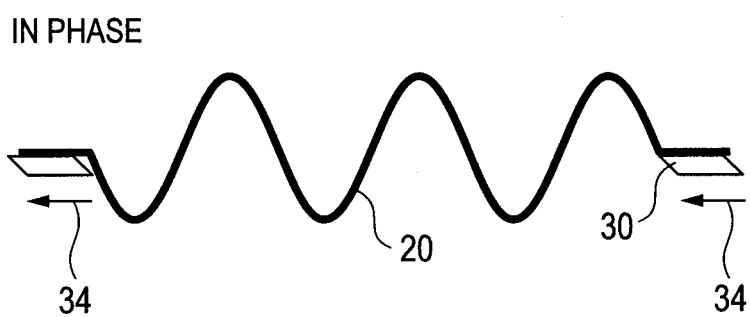

In the example illustrated in FIGS. 6A and 6B, the pair of the piezoelectric devices 30 on the right and left face each other with polarizations thereof being opposed to each other. However, the polarizations need not be opposed to each other as long as the polarization axes are parallel to each other, and the pair of the piezoelectric devices 30 may face each other as illustrated in FIG. 8B. In this case, when the pair of the piezoelectric devices 30 are applied with alternating voltages in the same phase, the vibration mode in the reversed phase as illustrated in FIG. 6B may be obtained.

In the above, the dust removing device 10 of the present invention is described, which includes, as illustrated in FIGS. 1A and 2, the pair of the plate-like piezoelectric devices 30 each in a rectangular solid shape and the vibrating plate 20 in a rectangular solid shape. As described above, the dust removing device 10, according to a most preferred configuration of the dust removing device 10 of the present invention, includes at least a pair of the plate-like piezoelectric devices 30 each in a rectangular solid shape, which are disposed on end portions of the vibrating plate 20 in a rectangular solid shape to be opposed to each other across a central region of the vibrating plate 20, in which the polarization axis direction 34 is parallel to a direction in which the pair of the piezoelectric devices 30 are opposed to each other.

However, the dust removing device 10 of the present invention is not necessarily limited to the above-mentioned configuration. The dust removing device 10 according to the present invention may be the dust removing device 10 to be installed on a base, which includes the piezoelectric device 30 in the form of a plate at least including at least the piezoelectric material 31 in the form of a plate and a pair of opposed electrodes each being disposed on a plate surface of the piezoelectric material 31 and the vibrating plate 20. In the dust removing device 10, the first electrode plane 36 of the piezoelectric device 30 may be fixedly bonded to a plate surface of the vibrating plate 20, the piezoelectric material 31 may be polarized in a direction parallel to the first electrode plane 36, and the piezoelectric device 30 may be driven by the thickness-shear vibration with the second electrode plane 37 being a reference plane. Here, the reference plane refers to a plane serving as a reference of the vibration of the piezoelectric device 30. When the piezoelectric device 30 vibrates with reference to the second electrode plane 37 as a reference plane, the vibration of the first electrode plane 36 of the piezoelectric device 30 in the length direction reaches a maximum. Accordingly, in the above-mentioned configuration, the flexural vibration of the vibrating plate 20 fixedly bonded to the piezoelectric device 30 through the first electrode plane 36 reaches a maximum.

For example, when the dust removing device 10 of the present invention is fixed to the base through the reference surface, a desired piezoelectric vibration may be generated in the dust removing device 10. Accordingly, in the dust removing device 10 of the present invention, the vibrating plate 20 does not need to be held to be fixed, and hence can be fixed to the base without degrading the dust removal performance. At the same time, the dust removing device 10 of the present invention is fixed to the base through the reference plane, which offers a feature that the flexural vibration of the vibrating plate 20 reaches a maximum. In other words, the dust removing device 10 of the present invention is most preferred to be fixed to the base through the reference plane. Further, in the dust removing device 10 of the present invention using the same piezoelectric material as that of the conventional dust removing device 15, the piezoelectric device 30 has a larger displacement capability. In other words, the present invention may provide the dust removing device 10, which is capable of utilizing the displacement capability inherent in the piezoelectric device 30 and achieving high dust removal performance, and easy to fix.

The piezoelectric material 31 forming the dust removing device 10 of the present invention is polarized in a direction parallel to the first electrode plane 36. However, the polarization direction may not necessarily be in complete parallel with the first electrode plane 36. For example, even when the polarization axis direction 34 is at an angle of 5 degrees from a complete parallel with respect to the first electrode plane 36, the effect of the displacement capability of the piezoelectric device 30 is reduced by 0.5%, which is 1.5% with the angle of 10 degrees. Accordingly, the polarization axis may be allowed to be at an angle of 10 degrees at maximum. Further, in the dust removing device 10 of the present invention, the piezoelectric device 30 has the first electrode plane 36 fixedly bonded to the plate surface of the vibrating plate 20. Here, when the piezoelectric device 30 is fixedly bonded to the vibrating plate 20 according to the present invention, the piezoelectric device 30 is restrained in a manner that a stress is generated at least between the piezoelectric device 30 and the vibrating plate 20 so that the flexural vibration is generated in the vibrating plate 20.

In the dust removing device 10 of the present invention, the piezoelectric device 30 and the vibrating plate 20 may contact each other across an area smaller than ½ of an area of the vibrating plate 20. In a case where the piezoelectric device 30 and the vibrating plate 20 contact with each other across an area larger than ½ of an area of the vibrating plate 20, the vibrating plate 20 does not vibrate in an area larger than the half of the entire area of the vibrating plate 20, which leads to degradation of dust removal performance.

Further, in the dust removing device 10 of the present invention, the piezoelectric device 30 may be preferred to be in a rectangular solid shape, with being polarized in a direction parallel to any one of the sides of the rectangular solid shape. The reason is as follows.

In the dust removing device of the present invention and in the conventional dust removing device, the flexural vibration generated in the vibrating plate forms a wavefront on the vibrating plate. The wavefront formed on the vibrating plate is parallel to the length direction of the piezoelectric device in a rectangular solid shape. In other words, the wavefront has a cross section in the length direction illustrated in each of FIGS. 6A to 8B. Here, FIGS. 6A to 8B each illustrate a certain section in the length direction of the wavefront. However, the dust removing device of the present invention or the conventional dust removing device is preferred to be capable of forming the wavefront illustrated in each of FIGS. 6A to 8B in the same shape, in a frontward direction and in a backward direction on the paper plane.

Figure 9A:
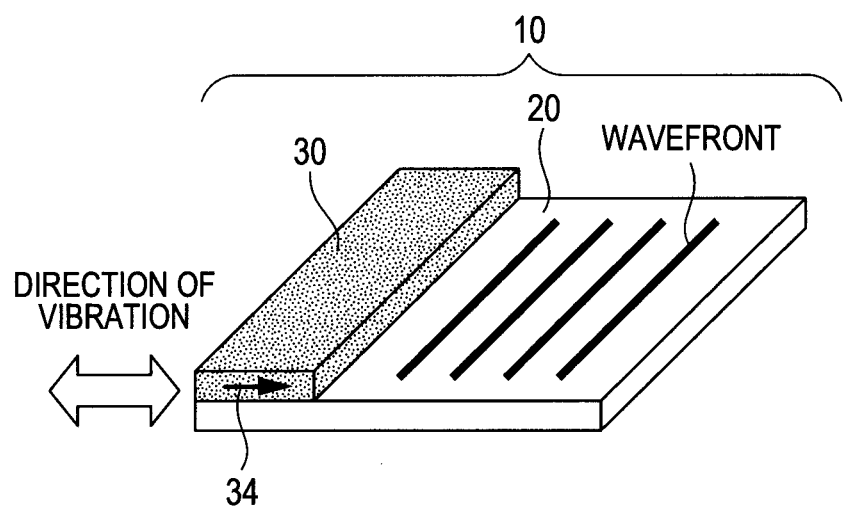
FIG. 9A is a schematic view illustrating a waveform to be formed on a vibrating plate of the dust removing device according to the present invention.

FIG. 9A illustrates a wavefront formed on the vibrating plate 20 of the dust removing device of the present invention. In FIG. 9A, the polarization axis direction 34 is parallel to a direction of a short side (hereinafter, referred to as lateral direction) which is orthogonal to the length direction of the piezoelectric device 30 in a rectangular solid shape, and the wavefront on the vibrating plate 20 is parallel to a direction of a long side (hereinafter, referred to as longitudinal direction) which is parallel to the length direction of the piezoelectric device 30 in a rectangular solid shape. Here, the same wavefront on the vibrating plate 20 may be formed with substantially equal amplitude in the longitudinal direction of the piezoelectric device 30 in a rectangular solid shape. The reason is that the piezoelectric device 30 of the present invention generates a thickness-shear vibration. As illustrated in FIG. 9A, the piezoelectric device 30 of the present invention vibrates only in a direction parallel to the polarization direction, and does not vibrate in any other length direction which is not parallel to the polarization direction. Accordingly, in the dust removing device 10 of the present invention, the wavefronts as illustrated in FIGS. 6A to 8B may be formed in a similar shape in a frontward direction and in a backward direction on the paper plane, that is, in the longitudinal direction of the piezoelectric device 30 in a rectangular solid shape, to thereby uniformly deliver dust removal performance across the entire area of the vibrating plate 20.

Figure 9B:
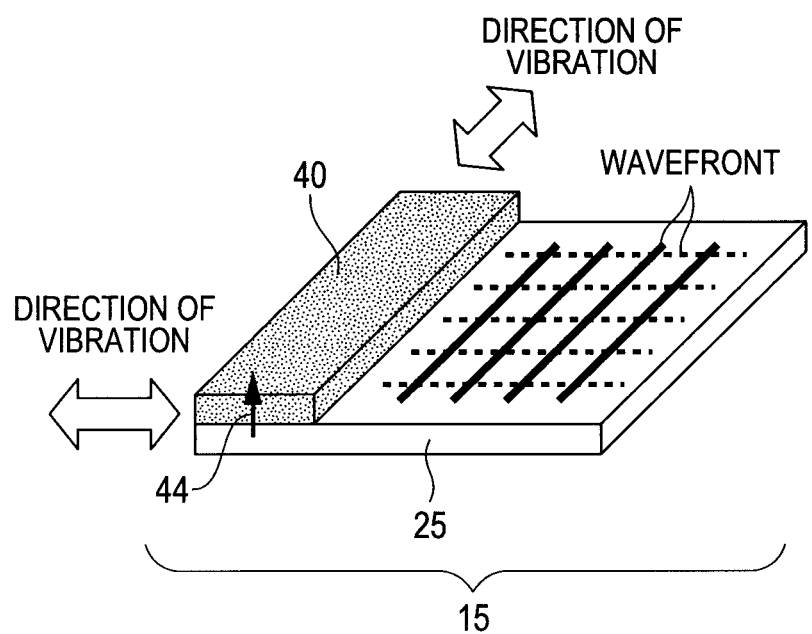
FIG. 9B is a schematic view illustrating a waveform to be formed on a vibrating plate of the conventional dust removing device.

On the other hand, FIG. 9B illustrates a wavefront formed on the vibrating plate 25 of the conventional dust removing device. In FIG. 9B, the polarization axis direction 44 is parallel to the thickness direction of the piezoelectric device 40 in a rectangular solid shape, and the wavefront on the vibrating plate 25 is parallel to a longitudinal direction of the piezoelectric device 40 in a rectangular solid shape. However, the same wavefront on the vibrating plate 25 may be difficult to be formed with substantially equal amplitude in the longitudinal direction of the piezoelectric device 40 in a rectangular solid shape. The reason is that the conventional piezoelectric device 40 generates a length vibration. As illustrated in FIG. 9B, the conventional piezoelectric device 40 vibrates omnidirectionally in the length direction of the piezoelectric device 40. In particular, in the case where the piezoelectric device 40 is in a rectangular solid shape, the wavefront on the vibrating plate 25 is to be formed by a combined vibration which is greatly affected by the vibrations in the lateral direction and in the longitudinal direction of the piezoelectric device 40 in a rectangular solid shape. Accordingly, in the conventional dust removing device 15, the wavefronts illustrated in FIGS. 6A to 8B may not be formed in a similar shape in the longitudinal direction of the piezoelectric device 40 in a rectangular solid shape, and hence the dust removal performance greatly varies depending on the area on the vibrating plate 25.

Due to the difference as described above, the dust removing device 10 of the present invention, in which the piezoelectric device 30 is in a rectangular solid shape and the polarization axis direction 34 is in parallel with any one of the sides of the rectangular solid shape, offers dust removal performance superior to that of the conventional dust removing device 15. According to the present invention, the shape of the vibrating plate 20 of the dust removing device 10 is not specifically limited, but the wavefront of the vibrating plate 20 formed on the vibrating plate 20 is also influenced by the shape of the vibrating plate 20. Further, the amplitude of the flexural vibration generated in the vibrating plate 20 is influenced by the material and the thickness of the vibrating plate 20. Accordingly, the vibrating plate 20 may be preferred to be in plate-like rectangular solid shape. In particular, the vibrating plate 20 is preferred to have a minimum thickness and hardness capable of fulfilling the function of the vibrating plate 20 while ensuring adequate strength therefor.

In the dust removing device 10 of the present invention, the piezoelectric device 30 is preferred to be disposed on an end portion on the plate surface of the vibrating plate 20. When the piezoelectric device 30 is disposed on the end portion on the plate surface of the vibrating plate 20, the vibration of the piezoelectric device 30 may be efficiently transmitted across the entire surface of the vibrating plate 20, to thereby efficiently deliver dust removal performance. Here, the piezoelectric device 30 does not necessarily need to be in complete contact with the end portion on the plate surface of the vibrating plate 20. For example, the dust removing device 10 may be disposed in a periphery close to the end portion of the vibrating plate 20, as long as the dust removing device 10 is disposed in a peripheral portion in which there is no practical need to remove dust.

Further, when multiple piezoelectric devices 30 are provided, the multiple piezoelectric devices 30 may be effectively controlled, to thereby form a desired wavefront across the entire surface of the vibrating plate 20. In particular, in the dust removing device 10 of the present invention, at least a pair of the piezoelectric devices 30 may be preferred to be disposed across a central region of the vibrating plate 20, and the polarization axis direction 34 may be preferred to be parallel to a direction in which the pair of the piezoelectric devices 30 are opposed to each other.

Figure 10A:
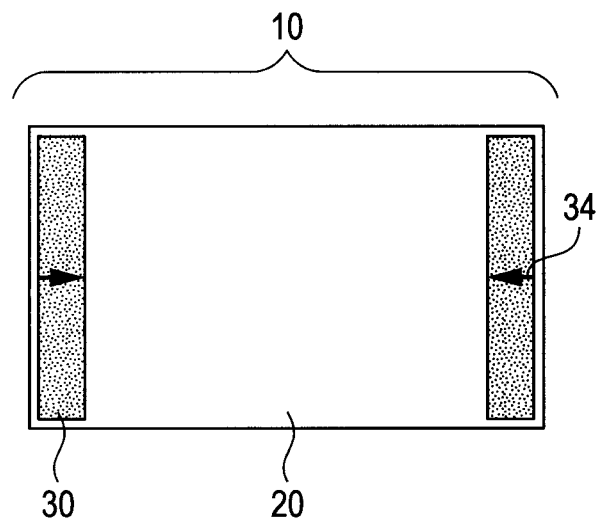
FIGS. 10A and 10B are schematic views each illustrating an embodiment of the dust removing device according to the present invention.
Figure 10B:
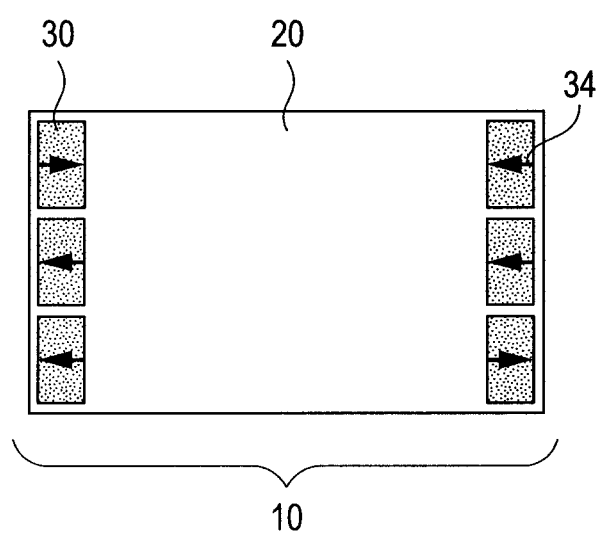

The dust removing device 10 of the present invention configured as described above offers excellent dust removal performance. The configuration is illustrated in FIGS. 10A and 10B. The piezoelectric devices 30 do not need to be opposed to each other as long as the polarization axes 34 thereof are parallel to each other. Further, as illustrated in FIG. 10B, the polarization direction of each of the multiple portions of the piezoelectric devices 30 is not specifically limited, as long as each pair of the multiple portions of the piezoelectric devices 30 have the polarization axis directions 34 parallel to the direction in which the pair of the multiple portions of the piezoelectric devices 30 are opposed to each other.

In the dust removing device 10 of the present invention, the piezoelectric device 30 may be preferred to be formed of a material having a lead (Pb) content of 1,000 ppm or less, and may be preferred to be formed of piezoelectric ceramics containing, for example, barium titanate as a major component. When the Pb content is 1,000 ppm or less, the lead component in the piezoelectric material is less likely to adversely affect the environment even when the dust removing device is discarded to receive acid rain and be exposed to a harsh environment.

The lead-free piezoelectric ceramics as described above are inferior in various properties to piezoelectric ceramics of lead zirconate titanate (PZT) under the present circumstances. However, for example, when the lead-free piezoelectric ceramics contain barium titanate as a major component, the magnitude of the piezoelectric displacement due to the piezoelectric thickness-shear effect is larger than the magnitude of the piezoelectric displacement due to the piezoelectric transverse effect, and even larger than the magnitude of the piezoelectric displacement due to the piezoelectric transverse effect of PZT, which is mainly used in the conventional dust removing device 15. In other words, in the dust removing device 10 according to the present invention, even when the piezoelectric ceramics as described above are used for the piezoelectric material 31, a dust removal effect equal to or larger than that of the conventional dust removing device 15 may be offered. Here, for example, in a case where the lead-free piezoelectric ceramics are piezoelectric ceramics containing barium titanate as a major component, the piezoelectric ceramics may include, as an accessory component, an element forming Pb or PZT, and in this case, the Pb content is preferred to be 1,000 ppm or less.

Further, the piezoelectric material 31 is preferred to have a large mechanical quality factor Qm. For example, in the case where the lead-free piezoelectric ceramics contain barium titanate as a major component, Qm may be increased to be equal to that of PZT through the addition of, for example, manganese (Mn), and accordingly the dust removing device 10 of the present invention may further be improved in dust removal performance.

The dust removing device 10 of the present invention has a feature that the vibrating plate 20 is formed of an optical material. The optical material according to the present invention refers to a material having an optical function with respect to incident light. Examples of the optical function include transmittance, refraction, interference, reflection, and scattering. The vibrating plate 20 may have, in addition to the function as the vibrating plate, an optical function to serve as, for example, an infrared cut filter or an optical low-pass filter. Here, the infrared cut filter is an optical member for blocking the transmission of near-infrared light (IR) while allowing visible light to pass therethrough, and is formed of, for example, glass. Further, the optical low-pass filter is an optical member for separating transmitted light into an ordinary beam and an extraordinary beam in order to eliminate high spatial frequency component of the light, and includes, for example, a multilayer of birefringent plates and phase plates which are made of crystal.

The dust removing device of the present invention is mounted on the base including, for example, an image pickup device such as a digital camera, and an image reading device such as a scanner.

Further, the vibrating plate 20 may be coated with a conductive material or the like in order to prevent dust from electrically adhering thereto. Further, the vibrating plate 20 may include multiple members separately having the above-mentioned different functions. In this case, for the vibrating plate 20, a member having a largest possible mechanical quality factor may be preferred to be selected as long as the member is capable of attaining the necessary functions as the vibrating plate 20.

Next, a method of manufacturing the dust removing device 10 of the present invention is described with reference to the dust removing device 10 illustrated in FIGS. 1A and 2, in which at least a pair of the piezoelectric devices 30 each in a plate-like rectangular solid shape are disposed on both end portions of the vibrating plate 20 in a rectangular solid shape to be opposed to each other across a central region of the vibrating plate 20, and the polarization axis direction 34 is parallel to a direction in which the pair of the piezoelectric devices 30 are opposed to each other.

According to the method of manufacturing the piezoelectric device 30 of the present invention, first, a piezoelectric ceramics powder which is adjusted to have a desired composition is added with a sintering agent such as a dispersant, and then is pressed into a shape with a pressure necessary for forming a high-density sintered body, to thereby manufacture a piezoelectric ceramics compact. Here, in a case where the necessary pressure cannot be obtained merely by the press forming, a desired pressure may be applied through, for example, cold isostatic press (CIP). Alternatively, without performing press forming, a compact ingot of piezoelectric ceramics may be formed through CIP or the like from the beginning. Next, the piezoelectric ceramics compact is baked, to thereby manufacture a piezoelectric ceramics sintered body. Any baking method appropriate for desired piezoelectric ceramics may be selected. Note that, if necessary, the piezoelectric ceramics compact may be processed into a desired shape before baking.

Next, the piezoelectric ceramics sintered body thus manufactured is subjected to grinding processing, to thereby manufacture piezoelectric ceramics in a rectangular solid shape having a desired dimension. Here, the piezoelectric ceramics after being baked serve as the piezoelectric material 31 of the present invention. However, the piezoelectric ceramics do not necessarily need to be processed to have a dimension of the piezoelectric device 30, or do not necessarily be in a rectangular solid shape.

The piezoelectric material 31 of the present invention is subjected to polarization treatment, generally at a temperature lower than the Curie temperature or the depolarization temperature of the piezoelectric material 31, for 5 minutes to 10 hours, in the air or in an incombustible oil such as a silicon oil, through application of an electric field of 0.5 to 5.0 kV/mm. In the piezoelectric material 31 of the present invention, the polarization axis direction 34 is eventually formed in the length direction of the plate-like piezoelectric material 31. Accordingly, the piezoelectric material 31 in a rectangular solid shape may be preferred to be equal to or smaller than 30 mm at a maximum in length in the polarization axis direction 34. In a case where the piezoelectric material 31 has a length larger than 30 mm, a power supply capable of applying a significantly large voltage becomes necessary when subjecting the piezoelectric material 31 to the polarization treatment.

Figure 11:
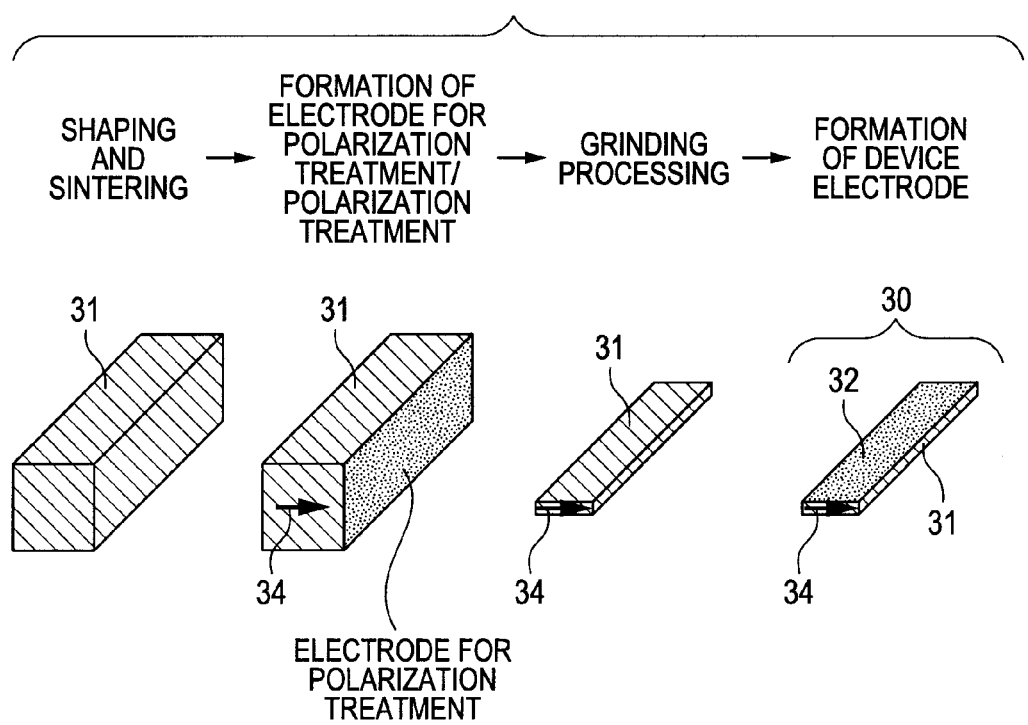
FIG. 11 is a schematic view illustrating a process of manufacturing the piezoelectric device according to the present invention.

The piezoelectric device 30 of the present invention is generally 0.1 mm to 10 mm in thickness. Accordingly, formation of an electrode, which is to be used for subjecting the piezoelectric material 31 to the polarization treatment, on a surface of the piezoelectric material in a rectangular solid shape, the surface being in parallel with the thickness direction of the piezoelectric material 31, and application of a desired voltage necessary for the polarization treatment are difficult. In view of this, as illustrated in, for example, a schematic view of FIG. 11 illustrating a process of manufacturing the piezoelectric device 30, the piezoelectric material 31 in a rectangular solid shape may be formed thick when performing the polarization treatment, and the electrode for the polarization treatment may be formed on a wide surface. After that, the rectangular solid shape after being subjected to the polarization treatment may be subjected to grinding processing so that the rectangular solid shape may be ground into a desired dimension of the piezoelectric device 30, and then the first electrode 32 and the second electrode 33 are formed as illustrated in FIG. 3, to thereby manufacture the piezoelectric device 30 of the present invention. At this time, in order to prevent the first electrode 32 and the second electrode 33 from being short-circuited, the electrode for the polarization treatment may be preferred to be removed through grinding processing after the polarization treatment. The electrode for the polarization treatment, the first electrode 32, and the second electrode 33 may be formed through, for example, printing of a silver paste, Au sputtering, or Au plating. However, after the polarization treatment, the device needs to be manufactured at a temperature lower than the Curie temperature or the depolarization temperature of the piezoelectric material 31, and hence the device may be preferred to be manufactured by a method which can be performed without increasing the formation temperature. Further, FIG. 11 illustrates an example in which one piezoelectric device 30 is formed from one piezoelectric material 31 in a rectangular solid shape which has been subjected to polarization treatment. However, the number of the piezoelectric devices 30 is not necessarily limited to one, and multiple piezoelectric devices 30 may be formed from one piezoelectric material 31 in a rectangular solid shape.

As described above, the piezoelectric material 31 of the present invention may be preferred to be subjected to polarization treatment in advance in the process of manufacturing the piezoelectric device 30, which is, however, not an absolute necessity. For example, the first electrode 32 and the second electrode 33 may be formed in part on an end portion diagonal to the first electrode plane 36 and the second electrode plane 37 of the piezoelectric device 30 which has been ground to a desired dimension of the piezoelectric device 30. After polarization treatment is performed by using those electrodes, the rest of the first electrode 32 and the second electrode 33 may be formed, to thereby manufacture the piezoelectric device 30. In this case, when the ratio of the thickness of the piezoelectric device 30 with respect to a distance between the first electrode 32 and the second electrode 33 each being disposed on the diagonal end portion is equal to or smaller than 17 to 100, the polarization axis direction 34 of the piezoelectric material 31 may be formed at an angle equal to or smaller than 10 degrees from a complete parallel with respect to the first electrode plane 36.

Next, as illustrated in FIGS. 1A and 2, the two piezoelectric devices 30 are fixedly bonded to the vibrating plate 20 formed into a desired dimension. At this time, the piezoelectric devices 30 each may be disposed so as to have the first electrode plane 36 of the piezoelectric device 30 disposed on an end portion on a plate surface of the vibrating plate 20. The piezoelectric devices 30 and the vibrating plate may be fixedly bonded to each other through, for example, an epoxy resin adhesive. An adhesive that may not degrade adhesiveness in the operating temperature range of the dust removing device 10 or the mechanical quality factor Qm of the dust removing device 10 may be preferred to be selected. Further, the piezoelectric device 30 has already been subjected to polarization treatment, and hence the bonding temperature may be preferred to be smaller than the Curie temperature or the depolarization temperature of the piezoelectric material 31.

In the above, the method of manufacturing the dust removing device 10 of the present invention is described in detail with reference to the dust removing device 10 illustrated in FIGS. 1A and 2, in which at least a pair of the piezoelectric devices 30 each in a plate-like rectangular solid shape are disposed on both end portions of the vibrating plate 20 in a rectangular solid shape to be opposed to each other across a central region of the vibrating plate 20, and the polarization axis direction 34 is parallel to a direction in which the pair of the piezoelectric devices 30 are opposed to each other. The dust removing device 10 of the present invention may not necessarily have the above-mentioned configuration. In such a case, an optimal manufacturing method may be selected as appropriate.

Example 1

In the following, the dust removing device of the present invention is specifically described with reference to Examples. However, the present invention is not limited by the following Examples.

First, a method of manufacturing the piezoelectric device of the present invention is described. Barium titanate particles with an average particle diameter of 100 nm (manufactured by Sakai Chemical Industry Co., Ltd., BT-03 as a trade name) were coated with manganese acetate (II) by using a spray dryer. According to inductively coupled plasma (ICP) mass spectrometry, the powder mix had a manganese content of 0.12% by mass.

Next, the powder mix was added with a polyvinyl alcohol aqueous solution at a concentration of 5% by mass, as a dispersant. The additive amount was determined so that polyvinyl alcohol in the polyvinyl alcohol aqueous solution was 3% by mass with respect to the powder mix. The mixture was mixed in a mortar, to thereby manufacture a granulated powder mix. The granulated powder mix was charged by 5.0 g into a mold in a size of 45.0×7.0 mm, and subjected uniaxial press forming under a pressure of 200 MPa. Next, the compact was baked in an electric furnace at 1,380° C. in an air atmosphere for two hours. The rate of temperature increase was 10° C. per minute, and the temperature was held at 600° C. for three hours during the increase, to thereby manufacture the piezoelectric material of the present invention. The piezoelectric material thus obtained had dimensions of 36.4×5.75×4 mm.

Next, polarization treatment electrodes were formed by using a silver paste on two surfaces each being in a size of 6.4×4 mm of the piezoelectric material, and the piezoelectric material was subjected to polarization treatment in a silicon oil by using a direct power supply. The temperature of the oil was 100° C., the applied electric field was 1 kV/mm, and the voltage was applied for 30 minutes at 100° C. Next, the piezoelectric material after the polarization treatment was subjected to grinding processing to be ground to be in a size of 36.4×5.75×0.25 mm, and the first electrode and the second electrode were pattern-formed in thicknesses of 30 nm and 380 nm, respectively, on two surfaces each being in a size of 36.4×5.75 mm of the piezoelectric material through DC magnetron sputtering in order of Ti to Au. Next, the piezoelectric material in a size of 36.4×5.75×0.25 mm was cut into a size of 33.3×4.0×0.25 mm, and then a diffraction electrode was pattern-formed through the above-mentioned DC magnetron sputtering in order of Ti to Au, so that the first electrode on the first electrode plane and the first electrode on the second electrode plane were short-circuited via one of the surfaces in a size of 4.0×0.25 mm of the piezoelectric material. At this time, it was confirmed that the first electrode and the second electrode were not short-circuited, to thereby manufacture the piezoelectric device of the present invention as illustrated in FIG. 3. Here, the polarization axis direction of the piezoelectric device was in a direction parallel to the side of 4 mm of the piezoelectric material in a rectangular solid shape.

Further, the piezoelectric device of the present invention was bonded through an epoxy resin adhesive along one side of 33.7 mm of the surface of a glass plate in a size of 50.8×33.7× 0.3 mm serving as an infrared cut filter, to thereby manufacture the dust removing device according to Example 1 of the present invention.

In order to confirm the effect of Example 1, frequency response calculation based on a finite element method was performed. This calculation was performed by using a finite element method packaged software ANSYS (manufactured by ANSYS Inc.). The dust removing device used as a model included the vibrating plate in a size of 50.8×33.7×0.3 mm, and the piezoelectric device in a size of 33.3×4.0×0.25 mm. The input values were an elastic coefficient, a density, and a Poisson ratio of the vibrating plate, and a dielectric constant, a piezoelectric constant, a flexibility matrix, and a density of the piezoelectric device. As the piezoelectric constant, values indicating magnitudes of piezoelectric displacements due to a piezoelectric transverse effect, a piezoelectric longitudinal effect, and a piezoelectric thickness-shear effect were input. The element count was provided sufficiently large. The restraint conditions were that (1) the second electrode plane of the piezoelectric device was fixed, and (2) the piezoelectric device was applied with a voltage of 10 V across the upper surface and the bottom surface. On the above-mentioned conditions, the frequency response calculation was performed in a range from 100 kHz to 120 kHz.

Figure 12:
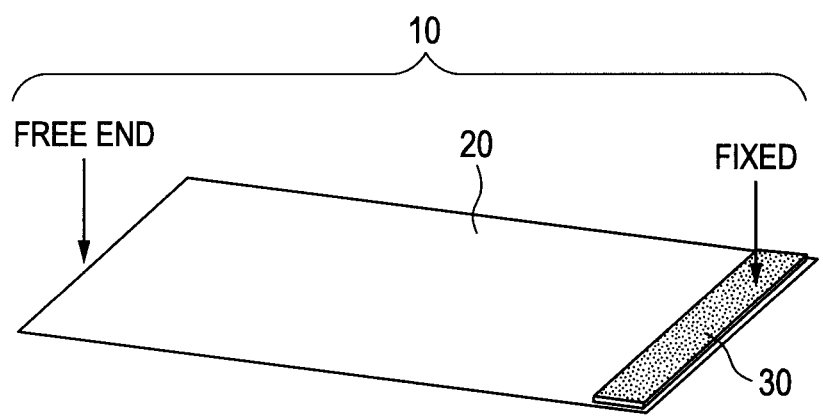
FIG. 12 is view illustrating a calculation model for a vibration of a dust removing device according to Example 1.
Figure 12:
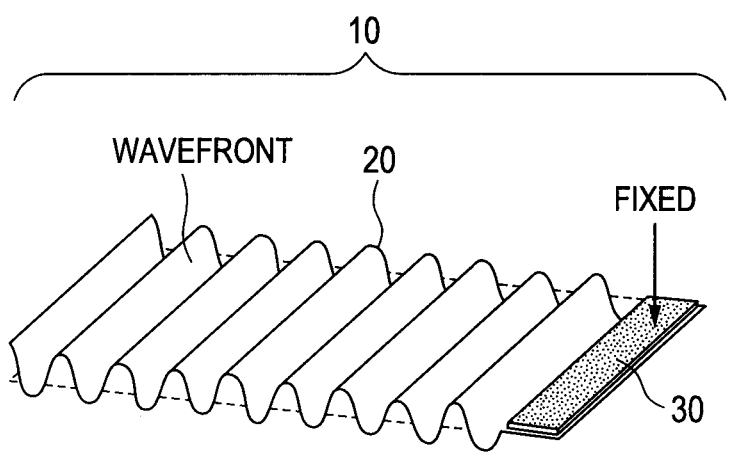

As a result of the calculation, a 17th order vibration mode illustrated in FIG. 12 was confirmed at 102.65 kHz. As illustrated in FIG. 12, though the second electrode plane of the piezoelectric device was fixed, across the entire surface of the vibrating plate except for the portion where the piezoelectric device is in contact with, a wavefront was formed with substantially equal amplitude in the longitudinal direction of the piezoelectric device in a rectangular solid shape. In other words, it was confirmed that the dust removing device of Example 1 is capable of providing dust removal performance substantially the same across the entire area of the vibrating plate.

Comparative Example 1

By using a method similar to that of Example 1, the dust removing device of Comparative Example 1 was manufactured similarly to Example 1, except in that the polarization axis direction was parallel to the film thickness direction of the piezoelectric material. In order to confirm the effect of Comparative Example 1, frequency response calculation based on a finite element method was performed in a range from 50 kHz to 400 kHz, on conditions similar to those of Example 1.

As a result of the calculation, no vibration mode was confirmed in the dust removing device of Comparative Example 1.

Example 2

By using a method similar to that of Example 1, the dust removing device of Example 2 of the present invention was formed similarly to Example 1, except in that the two piezoelectric devices of the present invention were further provided, as illustrated in FIG. 1A, along both sides of 33.7 mm of a glass plate having a function of an infrared cut filter. The two piezoelectric devices were disposed so that the polarization directions were opposed to each other.

In order to confirm the effect of Example 2, frequency response calculation based on a finite element method was performed in a range from 125 kHz to 145 kHz, on conditions similar to those of Example 1, except in that the restraint conditions were provided as (1) the second electrode planes of the two piezoelectric devices were fixed, (2) the piezoelectric device was applied with a voltage of 10 V across the upper surface and the lower surface, and (3) the two piezoelectric devices were applied with voltages in the same phase across the upper surface and the lower surface.

Figure 13:
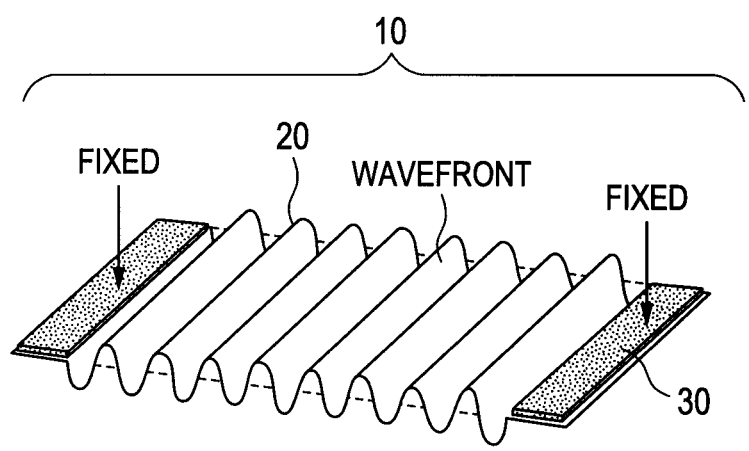
FIG. 13 is view illustrating a calculation model for a vibration of a dust removing device according to Example 2.

As a result of the calculation, a 17th order vibration mode illustrated in FIG. 13 was confirmed at 126.0 kHz. As illustrated in FIG. 13, though the second electrode plane of the piezoelectric device is fixed, across the entire surface of the vibrating plate except for the portions being in contact with the piezoelectric devices, a wavefront was formed with an equal amplitude in the longitudinal direction of each of the piezoelectric devices in a rectangular solid shape. In other words, it was confirmed that the dust removing device of Example 2 is capable of providing dust removal performance the same across the entire area of the vibrating plate.

Comparative Example 2

In order to compare the dust removing device of Example 2 and the conventional dust removing device through frequency response calculation based on a finite element method, a calculation model of the dust removing device was manufactured, which is similar to that of Example 2, except in that the polarization axis direction of each of the two piezoelectric devices was parallel to the film thickness direction of the piezoelectric material.

In order to confirm the effect of Comparative Example 2, frequency response calculation was performed in a range from 90 kHz to 120 kHz on conditions similar to those of Example 2, except in that the restraint conditions were provided as (1) the second electrode planes of the two piezoelectric devices were free ends, (2) the piezoelectric devices were each applied with a voltage of 10 V across the upper surface and the lower surface, and (3) the two piezoelectric devices were applied with voltages in the same phase across the upper surface and the lower surface.

Figure 14:
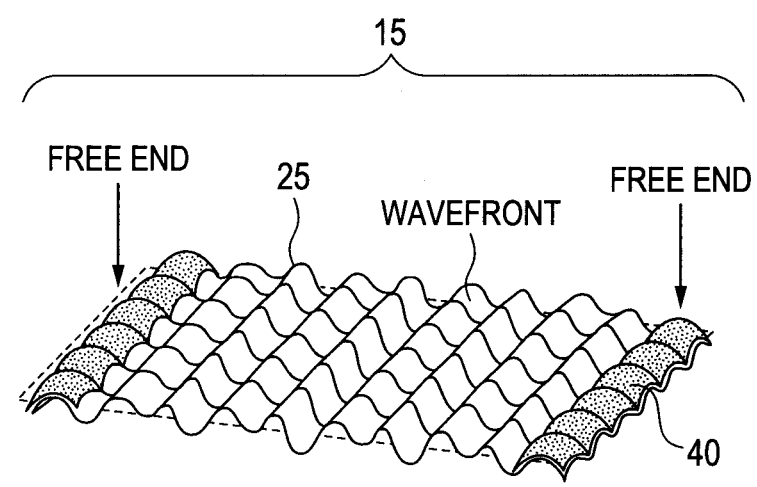
FIG. 14 is view illustrating a calculation model for a vibration of the dust removing device according to Comparative Example 2.

As a result of the calculation, an 18th order vibration mode illustrated in FIG. 14 was confirmed at 115 kHz. In the dust removing device according to Comparative Example 2, as illustrated in FIG. 14, the second electrode planes of the piezoelectric devices are not fixed, and hence the waveform is formed across an entire surface of the vibrating plate including a portion being in contact with the piezoelectric devices. However, the waveform on the vibrating plate is formed by a combined vibration significantly affected by the vibration in the lateral direction and the longitudinal direction of the piezoelectric device in a rectangular solid shape, and hence, unlike in the dust removing device of Example 2, a waveform with an equal amplitude in the longitudinal direction of each of the piezoelectric devices is not formed. Accordingly, in the dust removing device according to Comparative Example 2, the dust removal performance greatly varies depending on the area on the vibrating plate.

Further, as understood from Comparative Example 2, the dust removing device of Comparative Example 2 is not fixed at any position on the device. Accordingly, the dust removing device needs to be fixed by using a certain method. However, the dust removing device of Comparative Example 2 may not be held without affecting the vibration of the vibrating plate, no matter where the dust removing device of Comparative example 2 is held by a pressing member or a holding member. Accordingly, in the dust removing device of Comparative Example 2, even if the result of the calculation shows the vibration of an equal amplitude as the dust removing device of Example 2, the dust removal performance of Comparative Example 2 may become lower than the result of the calculation.

Example 3

Figure 15:
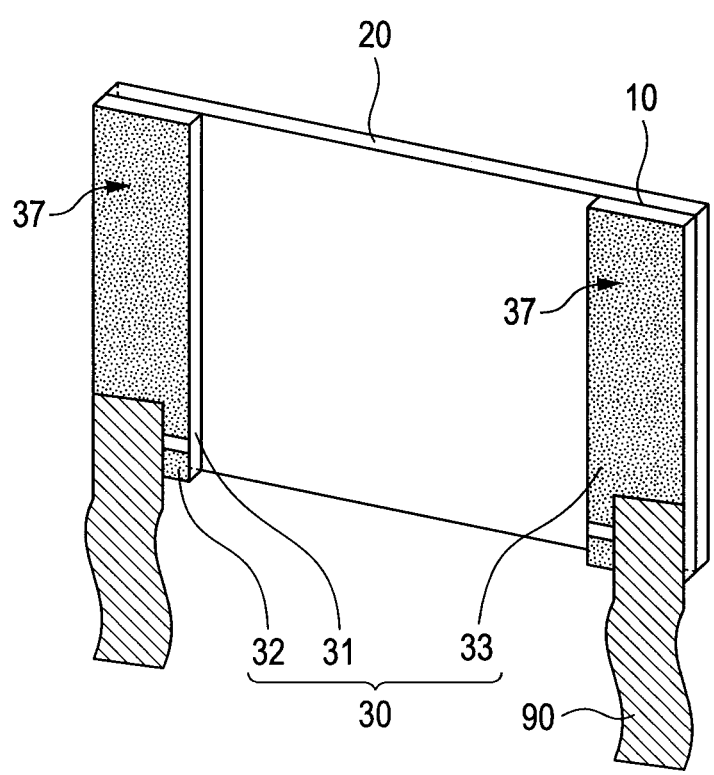
FIG. 15 is a schematic view of the dust removing device according to the present invention, to which flexible wiring cables are connected.

As illustrated in FIG. 15, a flexible wiring cable 90 was bonded through a conductive epoxy resin adhesive to a part of the second electrode plane of the piezoelectric device forming the dust removing device of Example 2, so as to allow a voltage to be applied thereto from a power supply via the flexible wiring cable 90. Next, the dust removing device configured as described above was fixed, through the second electrode plane of the piezoelectric device, to a stainless-steel support member, along with the portion of the flexible wiring cable being in contact with the piezoelectric device. Further, an alternating voltage of 15 Vpp was applied to the first electrode and the second electrode of the piezoelectric device via the flexible wiring cable from a power supply, to thereby manufacture a dust removing device unit capable of repeatedly vibrating in a 17th order vibration mode and in an 18th order vibration mode. Various plastic beads for evaluating the dust removal rate were sprayed on a surface of the vibrating plate of the dust removing device unit, and the dust removal rate on the vibrating plate was evaluated after a lapse of a predetermined period of time.

Table 1 shows the results of the experiment. The results proved that the dust removing device of the present invention exhibits a high dust removal rate even when a voltage is applied from a power supply included in, for example, a digital camera main body.

TABLE 1

|  | Beads 1 | Beads 2 | Beads 3 | Beads 4 |
|---|---|---|---|---|
| Dust removal rate | 99% | 98% | 99% | 98% |

(Note)
Beads 1: polystyrene of 30 μm in average particle diameter
Beads 2: polymethylmethacrylate of 30 μm in average particle diameter
Beads 3: silica of 30 μm in average particle diameter
Beads 4: a mixture of the beads 1, the beads 2, and the beads 3

The dust removing device of the present invention is capable of excellently removing dust adhering to a surface, and hence may be applied to various image pickup devices such as an image pickup element, a digital camera main body, a video digital camera, a copying machine, a facsimile machine, and a scanner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-269316, filed Nov. 26, 2009, which is hereby incorporated by reference herein in its entirety.

What is claimed is:

1. A dust removing method of removing dust from a vibrating plate, comprising:
    using a dust removing device, the dust removing device comprising the vibrating plate, a piezoelectric device in a form of a plate including a plate-shaped piezoelectric material, and first and second planar electrodes, the first and second planar electrodes being disposed to be opposed to each other on surfaces of the piezoelectric material, and the first planar electrode being fixedly bonded to a plate surface of the vibrating plate, the piezoelectric material being polarized parallel to the first planar electrode or in a direction inclined by not more than 10° with respect to a plane parallel to the first planar electrode, and the second planar electrode being fixed to a base;
    applying an alternating electric field between the first planar electrode and the second planar electrode, so that the piezoelectric device generates a thickness-shear vibration; and
    generating a vibration in the vibrating plate by the vibration of the piezoelectric device to thereby remove dust from the vibrating plate.

2. The dust removing method according to claim 1, wherein the piezoelectric device is provided at an end portion of the vibrating plate.

3. The dust removing method according to claim 1, wherein at least a pair of the piezoelectric devices are disposed to be spaced from and opposed to each other across a central region of said vibrating plate, and said piezoelectric material has a polarization axis direction that is parallel to a direction in which said pair of piezoelectric devices are spaced apart from each other.

* * * * *